United States Patent [19]

Wedding et al.

[11] Patent Number: 5,371,625
[45] Date of Patent: Dec. 6, 1994

[54] SYSTEM FOR OPTICALLY TRANSMITTING DIGITAL COMMUNICATIONS OVER AN OPTICAL FIBER WITH DISPERSION AT THE OPERATING WAVELENGTH

[75] Inventors: Berthold Wedding, Korntal; Martin Mittrich, Neuhausen, both of Germany

[73] Assignee: Alcatel N.V., Netherlands

[21] Appl. No.: 11,297

[22] Filed: Jan. 29, 1993

[30] Foreign Application Priority Data

| Feb. 1, 1992 | [DE] | Germany | 4202863 |
| May 21, 1992 | [DE] | Germany | 4216790 |
| Sep. 12, 1992 | [DE] | Germany | 4230601 |

[51] Int. Cl.$^5$ .......................................... H04B 10/12
[52] U.S. Cl. ................................. 319/173; 359/154; 359/182
[58] Field of Search ............... 359/154, 161, 173, 179, 359/188, 181–182, 194–195

[56] References Cited

U.S. PATENT DOCUMENTS

| 4,443,890 | 4/1984 | Eumurian | 359/161 |
| 4,561,119 | 12/1985 | Epworth | 359/161 |
| 4,786,797 | 11/1988 | Ely | 359/161 |
| 4,984,297 | 1/1991 | Manome | 359/191 |
| 5,023,950 | 6/1991 | Tsushima et al. | 359/154 |
| 5,191,462 | 3/1993 | Gitlin et al. | 359/194 |
| 5,227,908 | 7/1993 | Henmi | 359/181 |

OTHER PUBLICATIONS

"8 Gbit/s FSK Modulation of DFB Lasers with Optical Demodulation" by A. R. Chraplyvy, et al, Electronics Letters, 2nd Mar. 1989, vol. 25, No. 5, pp. 319–321.

"Operating Principle of In–Line Amplified Dispersion-Supported Transmission", C. Kurtzke et al, Electronics Letters, Oct. 28, 1993, vol. 29, No. 22, pp. 1969–1971.

"Conversion of a Wideband Frequency-Midulated Signal to Amplitude Modulation through Dispersion in an Optical Fiber", E. Bochove et al, Optics Letters, Mar. 1982, vol. 7, No. 3, pp. 139–141.

"FM-AM Conversion by Material Dispersion in an Optical Fiber", E. Bochove et al, Optics Letters, vol. 6, No. 2, Feb. 1981, pp. 58–60.

"Optical Fibres", J. Geisler et al, Pergamon Press, 1986, p. 439.

"Si–Bipolar ICS for a 5–Gb/s/Optical Receiver", H. Hamano et al, ECOC '90, Amsterdam, pp. 45–48.

"Data Transmission, vol. I", P. Bocker, Springer 1979, pp. 102–107.

"Semiconductor Circuit Technology", U. Tietze et al, 8th ed., Springer Publications, pp. 168–169 and 180–181.

"Das Sampling Oszilloskop", P. Klein, Franzis Publishers, Munich 1979, pp. 152–153.

"High–Speed III–V Semicondcutor Intensity Modulators", R. Walker, IEEE Journal of Quantum Electronics, vol. 27, No. 3, Mar. 1991, pp. 654–667.

Primary Examiner—Herbert Goldstein
Assistant Examiner—Kinfe-Michael Negash
Attorney, Agent, or Firm—Ware, Fressola, Van Der Sluys and Adolphson

[57] ABSTRACT

When digital signals are transmitted over optical fibers (3), which have a considerable chromatic dispersion at the wavelength being used, the length of the transmission path is very limited when the digital signal to be transmitted is converted into an optical signal by means of intensity modulation. If frequency modulation (also called FSK=Frequency Shift Keying) is used instead of the intensity modulation, the bridgeable path can be greatly increased, but requires a suitable optical receiver at the receiving end. The invention utilizes a simple optical receiver (4), which is not sensitive to frequency modulation, but to intensity modulation. This is possible, because an intensity variation is created, due to the chromatic dispersion of the optical fiber (3) and the resulting running time differences of signal portions at different wavelengths ($\lambda_0$, $\lambda_1$) from the initial frequency modulation during the transmission over the optical fiber (3), which process is contained in the digital signal.

22 Claims, 5 Drawing Sheets

SYSTEM FOR OPTICALLY TRANSMITTING DIGITAL COMMUNICATIONS OVER AN OPTICAL FIBER WITH DISPERSION AT THE OPERATING WAVELENGTH

TECHNICAL FIELD

The invention relates to a system for the optical transmission of a digital signal over an optical fiber or beam or optical waveguide and, more particularly, to detection thereof.

BACKGROUND OF THE INVENTION

Such a system for the optical transmission of a digital signal over an optical fiber with dispersion at the operating wavelength, with an optical sender at the transmitting end whose optical output is frequency-modulated by the digital signal, and having an optical receiver which converts its optical input into an electrical signal that corresponds to its intensity and recovers the digital signal from the electrical signal is known from: A. R. Chraplyvy et al: "8 Gbit/s FSK Modulation of DFB Lasers with Optical Demodulation", Electronics Letters, Mar. 2, 1989, Vol. 25, No. 5, pages 319 to 321.

When digital signals are transmitted at a high bit rate (in the giga-bit range), the chromatic dispersion (also known as material dispersion) of the beam waveguide at the operating wavelength of the optical transmission system is a problem, insofar as it limits the path length over which a high bit rate digital signal can be transmitted. On the one hand, it is desirable today to have an operating wavelength for the optical transmission in the range of 1550 nm, since suitable fiber-optic amplifiers are available for such wavelengths, and, on the other hand, the use of standard single mode beam waveguides, since these have already been used many times. For that reason, the problem of the chromatic dispersion of the beam waveguide must be solved in a different way than by selecting the operating wavelength or selecting the type of beam waveguide.

The known system describes the following solution: The intensity of the semiconductor laser at the transmitting end of the system is not modulated by the digital signal to be transmitted, as is normally the case, but rather by the frequency of its optical output signal. This modulation is called FSK modulation (FSK=Frequency Shift Keying), whereas the earlier intensity modulation is called "ASK" modulation (ASK=Amplitude Shift Keying). The FSK modulation is attained by modulating the injection current of the semiconductor laser in a clearly weaker form, namely by a clearly smaller increase in modulation than would be the case if the usual ASK modulation was to be obtained.

The frequency modulation gives the transmitted optical signal a smaller spectral range than would be the case with intensity modulation, so that the chromatic dispersion of the beam waveguide no longer has such a detrimental effect.

The known system has an optical interferometer at the receiving end, which converts the frequency modulation of the received optical signal into an amplitude modulation, and an optical receiver for direct reception, which receives the intensity modulated optical signal and recovers the transmitted digital signal from it. An optical receiver for direct reception is usually understood to be an arrangement with an optical detector, a preamplifier, an amplifier and a regenerator (the latter is sometimes also called decision circuit), where the optical detector, together with the preamplifier and the amplifier, converts the time process of the received optical signal's intensity into a corresponding time process of an electrical signal, and the regenerator recovers the digital signal from the electrical signal. For example, such optical receivers are explained in the book "Optical Fibers" by J. Geissler et al, Pergamon Press, Oxford, New York, Toronto, Sydney, Frankfurt, 1986, page 439, or in H. Hamano et al; proc. ECOC '90, Amsterdam, pages 45 to 48.

The known system is more expensive than earlier systems because of its optical interferometer, and therefore disadvantageous from the cost structure point of view, even if it has a higher output.

DISCLOSURE OF INVENTION

It is now an object of the present invention to find a simpler and therefore more cost-effective solution for the problem of transmitting a digital signal at a high bit rate over an optical fiber with dispersion at the operating wavelength.

According to a first aspect of the present invention, a system for the optical transmission of a digital signal over an optical fiber (3) with dispersion at the operating wavelength has an optical sender (2) at the transmitting end of the system, whose optical output signal is frequency-modulated by the digital signal, and has an optical receiver (4) at the receiving end, which converts its optical input signal into an electrical signal that corresponds to its intensity, and recovers the digital signal from the electrical signal, wherein the signal transmitted by the optical sender (2) as a frequency-modulated optical signal, and transmitted by the optical fiber (3) to the receiving end, is supplied as the input signal to the optical receiver (4), which reacts to the intensity of its optical input signal.

According to a second aspect of the present invention, a new receiving installation is provided, to receive a frequency-modulated optical signal, which has traversed a beam waveguide with dispersion at its wavelength. This is accomplished in an installation at the receiving end of a system for the optical transmission of a digital signal over a dispersion-affected optical fiber, wherein the digital signal is optically transmitted over the optical fiber by modulating the frequency of a semiconductor laser, wherein the installation at the receiving end contains an optical receiver (4), which converts its optical input signal into an electrical signal corresponding to its intensity, and recovers the digital signal from the electrical signal, wherein the input signal of the optical receiver (4), which reacts to the intensity of its optical input signal, is the frequency-modulated signal originally transmitted over the optical fiber.

According to a third aspect of the present invention, a dispersion-affected optical fiber is provided for converting an optical signal's original frequency modulation into an intensity modulation. This use is of an optical fiber, with dispersion at a predetermined wavelength, for converting an optical signal of the same wavelength, which was frequency modulated by a digital signal, into an optical signal that contains the digital signal in its intensity.

The transmission of digital signals is subject to undesired deformations of the digital signal, which degrade the quality of the transmission.

For that reason, so-called visual diagrams are used to evaluate the quality of the transmission. This method is known e.g. from the book "Data Transmission, Volume I" by P. Bocker, published by Springer 1979, page 102ff. However, no influence on the quality of the transmission is provided.

The present invention has the further object of providing a solution that continuously influences the quality of the transmission. According to a fourth aspect of the present invention, a system is provided which optically transmits a digital signal over an optical fiber (3) by means of an optical sender (2) and an upstream amplifier (20) at the receiving end, which consists of an optical-electrical converter (5) with a photodiode (13) and a decision circuit (6), wherein the receiving end is equipped with a device (60) for acquiring a visual diagram of the received digital signal and a computer (105), which compares the received visual diagram with a predetermined visual diagram, and derives one or more correction variables for one or more adjustable system components from any deviations, thereby adjusting these system components.

Configurations according to this fourth aspect of the invention are described and claimed.

In addition to the undesired deformations during transmission, errors can occur when the digital signal is received. This can take place, for example, when long series of equal binary signals exist, e.g. a series of logic "1's" and interfering impulses take place in the receiver, for example due to background noise in the receiver or in the electric preamplifier. The digital signal is normally scrambled before transmission (by a Scrambler), to prevent long series of equal binary signals. However, there are communication transmission systems in which the digital signal is not scrambled. These may be subject to errors in the received digital signal. It is still another aspect of the invention to provide a solution that decreases the frequency of the errors. This is accomplished by a circuit arrangement provided at the transmission end, which emits a positive or negative output voltage when a predetermined number of successive equal binary signals of the input signal are present, and an optical intensity modulator (230) is present, which increases the light output of the optical signal according to the starting voltage of the circuit arrangement when the successive equal binary signals reach a first binary state, and which lowers the light output of the optical signal when the successive equal binary signals reach a second binary state.

Before describing the invention in more detail by means of the drawings, its basic idea will first be explained. According to the invention, the installation at the transmission end remains unchanged with respect to the known system mentioned in the beginning, so that a frequency-modulated optical signal is transmitted to the receiving installation over the optical fiber. The receiving installation, however, is an essentially known optical receiver for direct reception, which typically has the characteristic of converting intensity fluctuations of its optical input signal into an electrical output signal, therefore it is not sensitive to frequency modulation but rather to intensity modulation.

Thus the question naturally arises, why does the system according to the invention still work? The explanation is the following perception or insight according to the invention: the optical signal that is radiated into the beam waveguide at the transmission end consists of portions of different wavelengths, which are successively radiated into the beam waveguide at the transmission end. Because of the chromatic dispersion of the beam waveguide, the two signal portions are subject to different delays during their transmission over the beam waveguide. At the end of the beam waveguide, the signal portions of different wavelengths are displaced in time with respect to each other. The resulting interference of the two signal portions leads to a variation in the intensity of the optical signal leaving the end of the beam waveguide. The time process of the variation in intensity has the characteristic that the digital signal to be transmitted can be derived from it.

Accordingly, the invention makes use of the insight that the beam waveguide path itself (precisely because of the basically undesirable characteristic of its chromatic dispersion) has the effect of converting a beginning frequency modulation into such an intensity modulation, which contains the digital signal.

In other words: The dispersion-affected beam waveguide itself is used to convert the original frequency modulation into an intensity modulation. The transmitted optical signal is immediately used as the input signal to the optical receiver, which responds to intensity. However, this does not prevent other optical installations, which are not used for converting the type of modulation, but serve other purposes, such as e.g. an isolator or an optical amplifier, to be installed upstream of the optical receiver.

If the length of the optical fiber needed to bridge the transmission path is insufficient to effect the required modulation conversion, it can be extended by an additional optical fiber. In that instance, the optical output signal from the full length of the optical fiber is used as the input signal to the optical receiver. Another aspect is that, in that case, both the total length of the optical fiber as well as its partial lengths are used to convert the type of modulation.

The following should be pointed out with respect to the concept of "frequency modulation" or "FSK modulation" used here: The concept is not limited to a pure frequency modulation. As with the known system mentioned before, it is essentially a semiconductor modulation, which is realized with a small increase in modulation. In most cases, the intensity of the optical output signal does not remain constant, but changes together with the frequency. Still, such modulation is described as an FSK or frequency modulation. It is important not to convert the thus produced optical output signal into an ASK modulation at the receiving end by means of a special device, but rather to process it directly with a receiver that responds to intensity modulations.

These and other objects, features and advantages of the present invention will become more apparent in light of the detailed description of a best mode embodiment thereof, as illustrated in the accompanying drawing.

BEST MODE FOR CARRYING OUT THE INVENTION

Figures 1, 2A, 2B, 2C, 2D, 3, 4, 5:
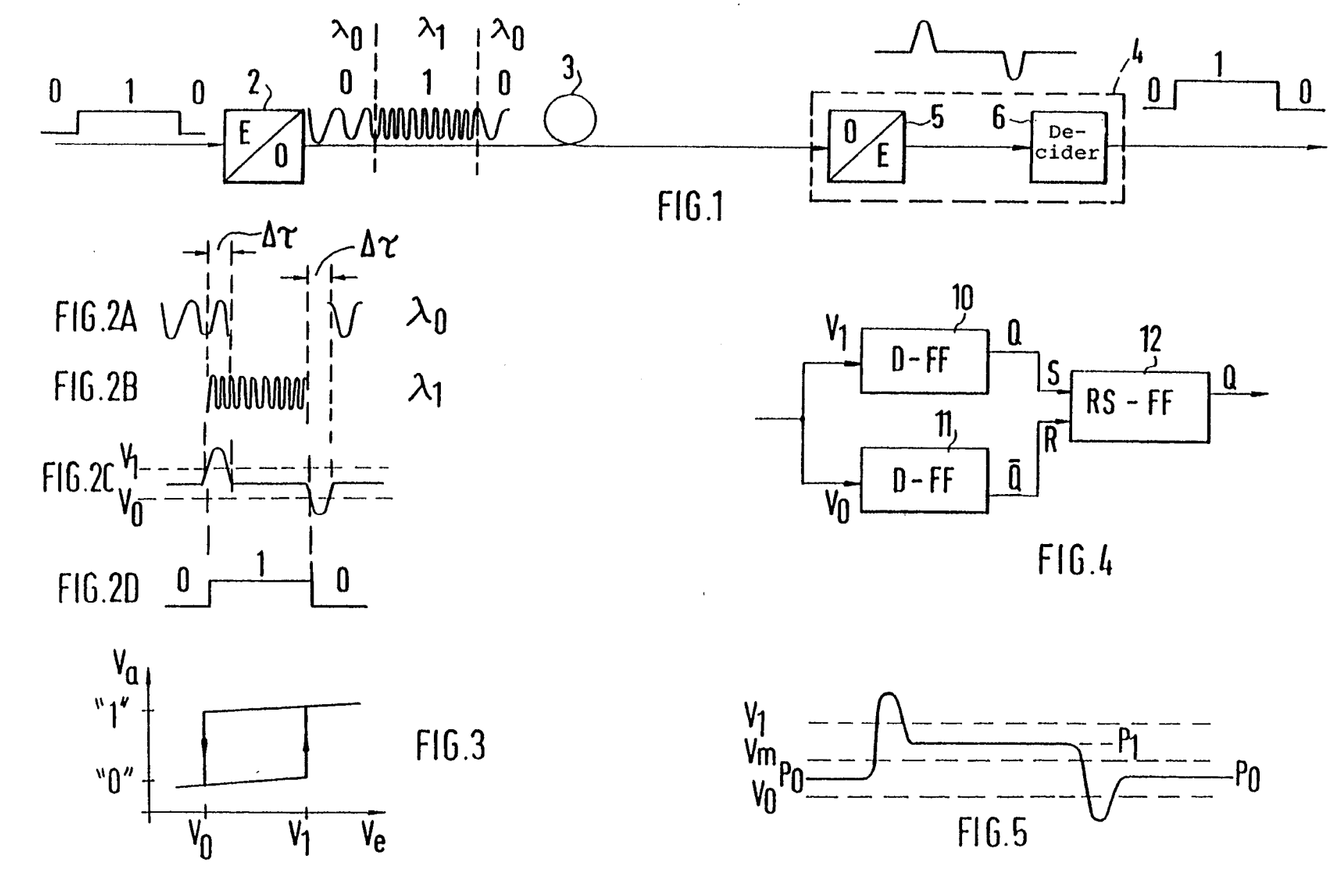
FIG. 1 is a block diagram of the system according to the invention.
FIGS. 2(A)–2(D) show the signal at different points of the transmission system, to clarify its function.
FIG. 3 shows the typical curve of a Schmitt-Trigger used as the decision circuit 6 (FIG. 1).
FIG. 4 is a configuration example of the decision circuit in FIG. 1.
FIG. 5 shows the intensity of the optical receiver's input signal when a frequency modulation with simultaneous amplitude modulation takes place at the transmission end.

The transmission system for digital signals according to the invention, shown in FIG. 1, contains an electrical-optical converter 2 at its transmission end (left side of the figure), whose essential element is a semiconductor laser and which, like the state of the art, has the characteristic of converting an electrical input signal in the form of a binary digital signal into a correspondingly modulated optical output signal by means of FSK=Frequency Shift Keying. The optical output signal therefore has different frequencies for the different binary states of the digital signal to be transmitted. In FIG. 1, wavelength $\lambda_0$ corresponds to binary state 0 and wavelength $\lambda_1$ to binary state 1. With this modulation, the intensity normally remains constant, as indicated schematically by wave trains with different frequencies but with the same amplitude.

This installation at the transmission end is linked by an optical fiber 3, which forms the transmission path, to the system's installation at the receiving end. What is new in the system in FIG. 1 is that no device is installed at the receiving end to convert the transmitted optical signal into an amplitude modulation, but that the transmitted optical signal directly forms the input signal to an optical receiver 4 that is essentially known but for other purposes.

The optical receiver 4 contains an optical-electrical converter 5, which contains an optical detector, a preamplifier and an amplifier, and converts the time process of the intensity of its optical input signal into a time process of the amplitude of its electrical output signal. The optical receiver 4 furthermore contains a decision circuit 6 (sometimes also called regenerator), which recovers the transmitted digital signal from the electrical output signal of the optical-electrical converter 5. The digital signal is schematically indicated at the output.

The same question arises here as well, why an optical receiver 4, which typically responds to the intensity fluctuations and not to the frequency fluctuations of its optical input signal, is able to convert a transmitted frequency-modulated optical signal into the digital signal contained therein. The explanation is: It is the optical fiber path 3 itself that forms an amplitude modulation from the initial frequency modulation of the radiated optical signal, and the resulting amplitude modulation has the characteristic that the transmitted digital signal is contained therein.

It is schematically indicated in FIG. 1, above the optical receiver 4, that the intensity of the received signal, which the converter 5 changes into a course corresponding to its electrical output signal, first has a positive impulse and then a negative impulse, as seen from left to right. As clarified in FIG. 2, the positive impulse indicates that the digital signal changes from the 0 state to the 1 state, and the negative impulse indicates that it changes from the 1 state to the 0 state. Thus, any circuit is suitable as a decision circuit 6, if it lets its digital output signal change from 0 to 1 when its input signal exceeds a predetermined upper threshold value, and if it lets its digital output signal change from 1 to 0 when its electrical input signal falls short of a predetermined threshold value. Essentially, as is the case with every known optical receiver, the decision circuit has the task of recovering the digital signal contained in the electrical output signal of the optical-electrical converter 5. As always, its individual function depends on the progress of its electrical input signal. For this particular instance, several configuration examples will be provided later on by way of illustration and not limitation.

It will now be explained by means of FIG. 2, how the conversion of the initial frequency modulation into an intensity modulation takes place during the transmission of the optical signal over the beam waveguide 3.

First, the example shown in FIG. 1 is recalled, in which successive wave trains with the $\lambda_0$, $\lambda_1$ and $\lambda_0$ wavelength are radiated into the optical fiber at a transmitted bit rate of 0 1 0. In FIG. 2, the wave trains (or signal portions of the optical signal), which are successively radiated into optical fiber 3, are not illustrated in one, but in two lines; line (a) shows the wave trains with the $\lambda_0$ wavelength, and line (b) shows the wave train with the $\lambda_1$ wavelength. Both refer to a common time axis running from left to right.

The chromatic dispersion of optical fiber 3 causes light with the larger wavelength to require more time to pass through the beam waveguide path than light with the smaller wavelength. If we look at the reception of the signal portions with the different wavelengths at the end of the optical fiber, we note a time period of $\Delta\tau$, during which the last portion of the first wave train with a wavelength of $\lambda_0$, and simultaneously the first portion of the wave train with a wavelength of $\lambda_1$ already take place. In other words: The wave train with wavelength $\lambda_1$ has already reached the end of the optical fiber, before the slower expanding wave train with the $\lambda_0$ wavelength has ended. $\Delta\tau$ is the time difference of both wavelengths and is calculated as follows:

$$\Delta\tau = \Delta\lambda \cdot D \cdot L,$$

where $\Delta\lambda$ is the difference between $\lambda_0$ and $\lambda_1$,

D is the chromatic dispersion of the optical fiber 3, and L is the length of the path of optical fiber 3.

$\Delta\tau$ may not be longer than the duration of a bit of the digital signal. A suitable value can be obtained by selecting $\Delta\lambda$, i.e. in practice by the increase in modulation, and possibly length L (D is predetermined).

In the same manner as the beginning of the wave train with wavelength $\lambda_1$, its end has an effect based on different running times, namely a condition that exists during the running time difference $\Delta\tau$, when the wave train $\lambda_1$ has already ended and the second wave train with a wavelength of $\lambda_0$ has not yet begun.

In this way the difference in running time of the different wavelengths, when changing from $\lambda_0$ to $\lambda_1$, provides the condition of duration $\Delta\tau$ that the two waves have been received simultaneously, and when changing from $\lambda_1$ to $\lambda_0$, the condition of the same length of time, that neither of the two waves can be received. The first state signifies an interference in both waves with the consequence that the resulting wave has a higher intensity than either of the two individual waves, and the second state signifies a decrease to zero in the received intensity.

Line (c) in FIG. 2 is on the same timeline as (a) and (b) and schematically shows the resulting intensity of the optical signal leaving the end of optical fiber 3, which the optical-electrical converter converts into a corresponding course of its electrical output signal. Depending on the sign preceding the dispersion and $\Delta\lambda$, this has a positive impulse when changing from $\lambda_0$ to $\lambda_1$, for example, and a negative impulse when changing from $\lambda_1$ to $\lambda_0$. The decision-circuit 6 can recover the transmitted digital signal from the process, by letting the binary state of its output signal change from 0 to 1 when its input signal exceeds a predetermined first threshold value $V_1$, and changes from this condition into the binary state 0, when its input signal falls short of a second predetermined threshold value $V_0$. Line (d) in FIG. 2 is on the same timeline as (a), (b) and (c) and shows the process of the recovered binary digital signal. The first threshold value $V_1$ is selected so that it is above the signal value created when a single wave is received, and the second threshold value $V_0$ is selected so that it is under this "normal" signal value.

The output signal of the optical receiver is therefore a bipolar signal, and the decision-circuit 6 has the task of recovering the binary digital signal from it in the usual NRZ form (NRZ=Non Return to Zero). The following explains several suitable configurations for decision-circuit 6. A "Schmitt-Trigger" with a characteristic curve according to FIG. 3, is a suitable decision-circuit, which goes from binary state 0 to binary state 1 when its input voltage exceeds a first threshold value $V_1$, as shown in FIG. 2c, and goes from binary state 1 to binary state 0 when its input voltage falls short of a second threshold value $V_0$, which is lower than $V_1$.

FIG. 3 shows the curve of such a Schmitt-Trigger as the process of the output voltage $V_a$ over the input voltage $V_c$. If the input voltage $V_c$ increases, its output voltage changes at a threshold value of $V_1$ from a lower value, which signifies the binary state 0, to a higher value, which signifies the binary state 1. If the input voltage decreases from a value above $V_1$, the output voltage only flips back from the second state to the first state at a lower threshold value of $V_0$.

Schmitt-Triggers as such are known, for example from the book "Semiconductor circuit technology" by U. Tietze and C. Schenk, 8th. edition, Springer Publications Berlin, Heidelberg, New York, pages 168 to 169 and 180 to 181.

Another configuration example is an integrator in the form of an RC low-pass filter. Its output signal rises with a positive impulse and falls with a negative impulse, so that a simple flip-flop can easily recover the rising or falling side of the transmitted digital signal from its rising or falling side. An integrator with different time constants is used in the event the positive and the negative impulses contain different energies. This is possible if an RC low-pass filter with voltage-dependent capacity is used, for example the capacity of a varactor diode.

Another example of a suitable decision-circuit is the circuit shown in FIG. 4, consisting of two D-flip-flops and one RS-flip-flop. The input signal flows in parallel to the two-D-flip-flops 10 and 11. The RS-flip-flop 12 has inputs R and S, which are connected to output Q of flip-flop 10, or to output $\overline{Q}$ of flip-flop 11. Flip-flop 10 flips to the condition of Q=1 when the input signal of the decision-circuit exceeds the threshold value $V_1$, and D-flip-flop 11 flips to the condition of $\overline{Q}=1$ when the input signal falls short of the threshold value $V_0$. The RS-flip-flop 12 flips to the condition of Q=1 when its input S flips to this condition, therefore when output Q of D-flip-flop 10 becomes 1, and flips to the condition of Q=0 when its input R becomes 1, in other words when output $\overline{Q}$ of D-flip-flop 11 becomes 1. Output Q of RS-flip-flop 12 therefore emits the recovered binary digital signal.

Instead of the two D-flip-flops 10 and 11 shown in FIG. 4, a single D-flip-flop with two inverted outputs Q and $\overline{Q}$ can be used, where internal asymmetry in the circuit design provides for an upper threshold value, which causes it to go to the condition of Q=1 when it is exceeded, and a lower threshold value $V_0$, which causes it to return to the condition of $\overline{Q}=1$ when it falls short. In that case it has a circuit hysteresis of the kind shown in FIG. 3.

A special configuration of the decision-circuit 6 in FIG. 1 is possible, if the optical signal produced at the transmitting end of the system has the characteristic of the described frequency modulation being accompanied by an intensity modulation. This takes place if the semiconductor laser is modulated with the injection current. Such a modulation must be differentiated from the normal intensity modulation of the semiconductor laser, which is produced by a much larger increase in modulation. Thus, it is a frequency modulation in the first place.

Such a frequency modulation is being considered, which produces a higher level of the optical output signal at wavelength $\lambda_1$, than at wavelength $\lambda_0$. In that case, the signal occurring at the output of the optical-electrical converter 5 proceeds as shown in FIG. 5. It starts at a level $P_0$, at which the wave train with wavelength $\lambda_0$ is received, rises in pulsed form like the signal in FIG. 2c, returns to a level $P_1$, at which the wavetrain of wavelength $\lambda_1$ is received, and from there drops back to level $P_0$, in pulsed form, with a negative impulse. In that case it is sufficient to detect when a single threshold value $V_m$, has been exceeded at the start of the positive impulse, and to detect when it falls short at the start of the negative impulse. Use is made here as well of the existence of the positive and negative impulse, which results from the frequency modulation. The decision-circuit can then be a conventional decision-circuit, e.g. a D-flip-flop with a threshold value of $V_m$, as normally used with known optical receivers.

Of course, a decision-circuit of the type shown in FIG. 4, with two threshold values $V_1$ and $V_0$, can be used.

The following configuration is also possible$ by deviating from the above explained realization of the integrator as a component of the decision-circuit, where the integrator is placed after the optical-electrical converter.

The invention makes use of the fact that the photodetector has a capacitance $C_D$, and functions as an RC low-pass filter in conjunction with an additional resistor R or the input resistor $R_i$ of a subsequent amplifier. The capacitance $C_D$ of the photodetector can be varied by adjusting the bias voltage $V_D$, thereby affecting the integrating effect of the optical-electrical converter.

Figure 6A:
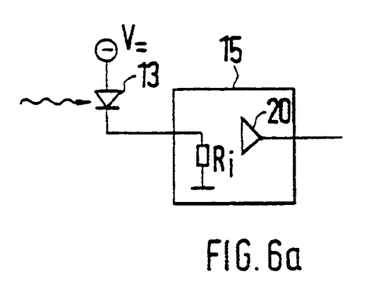
FIGS. 6(a)–6(b) show two configuration examples of an optical-electrical converter.
Figure 6B:
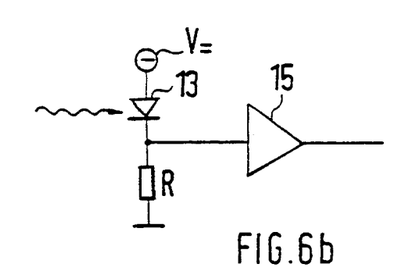

FIG. 6 shows configuration examples of an optical-electrical converter 5. In this instance, a bias voltage $V_=$ is supplied to photodetector 13. The capacitance $C_D$ of photodetector 13 functions as an RC low-pass filter, in conjunction with the input resistor $R_i$ of amplifier 15 in FIG. 6a, or with an additional resistor R, as shown in FIG. 6b. FIG. 6a shows the input resistor $R_i$ separately, as a component of amplifier 15.

Figure 7A:
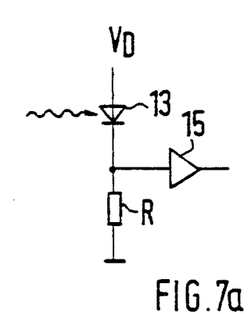
FIGS. 7(a)–7(c) show replacement circuits to explain the low-pass filter effect of the optical-electrical converter.
Figure 7B:
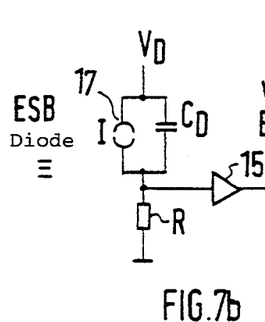
Figure 7C:
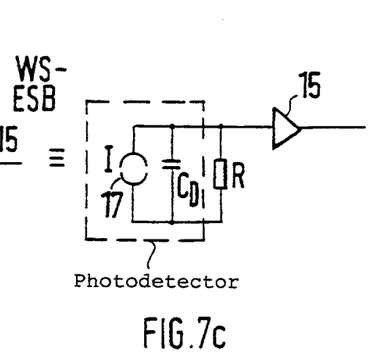

The explanation of the integrator or low-pass filter function is provided by means of FIG. 7, starting with the configuration example in FIG. 6b. FIG. 7b uses the simplified replacement circuit diagram for the photodetector. The power source provides a photo current, whose amount depends on the radiated light output. The adjacent alternating current circuit diagram in FIG. 7c shows the parallel circuit of an ideal power source 17, resistor R and capacitance $C_D$. The RC low-pass filter can be recognized therein.

As mentioned earlier, visual diagrams may be made to evaluate the transmission quality. The making of visual diagrams generally represents a laboratory measure to evaluate the transmission quality. In this instance it serves to affect the transmission quality and is a component of the system.

The following describes in detail how the transmission quality is affected.

Figure 8:
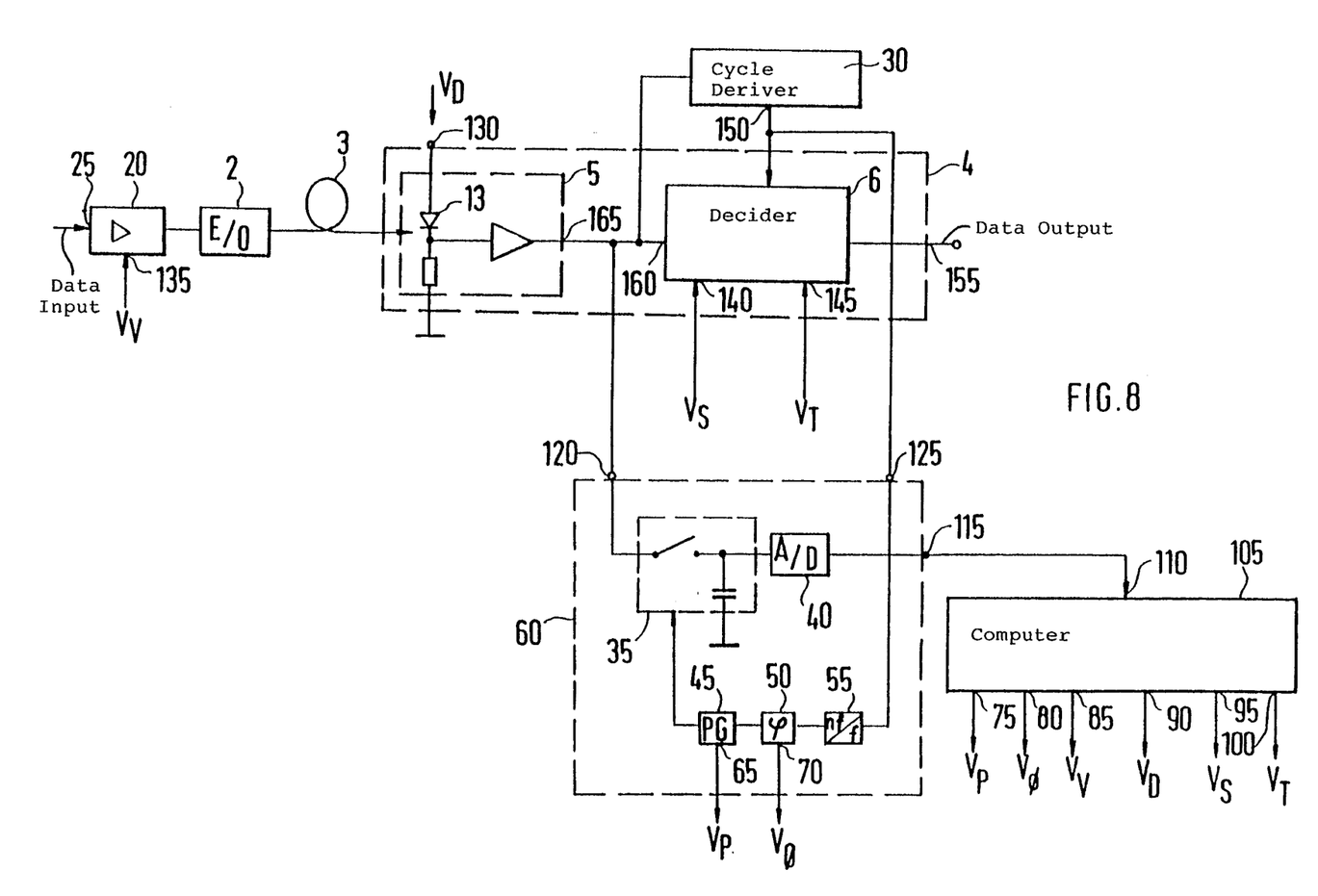
FIG. 8 is a block diagram of a system with an installation to acquire visual diagrams and with a computer.

The system is shown in FIG. 8, with the additions according further to the invention. It consists additionally of a controllable amplifier 20, a device 60 for making visual diagrams, a computer 105 and a device 30 for deriving the cycle of the digital signal. This device for deriving the cycle is a component of each digital transmission system, but was not drawn in FIG. 1. It is connected to an output 165 of the optical-electrical converter 5 and to an input 160 of the decision-circuit 6, and has an output 150 for indicating the cycle.

The amplifier 20 has an input 25 for the digital signal and an input 135 for a correcting variable $V_\nu$, and is linked to the electrical-optical converter 2.

In addition to the already mentioned input 160, the decision-circuit has another input 140 for a correcting variable $V_S$, an input 145 for a correcting variable $V_T$ and a data output 155.

The optical-electrical converter 5 has an input 130 for a correcting variable $V_D$, which is connected to the photodiode 13.

The device 60 for making visual diagrams is linked to the output 165 of the optical-electrical converter 5 by an input 120, and to the output 150 of the device 30 for deriving the cycle by an input 125. It consists of a scan-lock circuit 35, an analog-digital converter 40, a frequency divider 55, which is connected to the input 125, followed by the phase shifter 50 and pulse generator 45, which is connected to the scan-lock member 35. The pulse generator has an input 65 for a correcting variable $V_P$ and the phase shifter 50 has an input 70 for a correcting variable $V_\phi$.

The computer 105 is linked by input 110 to an output 115 of the device 60 for making visual diagrams. It has the following outputs for the following correcting variables:

output 75 for $V_P$ output 80 for $V_\phi$
output 85 for $V_\nu$
output 90 for $V_D$
output 95 for $V_s$
output 100 for $V_T$.

The function of device 60 for making visual diagrams corresponds to a sampling oscilloscope, whose function is described, for example, in Klein, P. E., "The Oscilloscope" Franzis Publishers, Munich 1979.

The device 60 determines the process of the visual diagram, which results from the received digital signal. This visual diagram is called an actual visual diagram. The computer 105 compares this actual visual diagram with a predetermined visual diagram, the specified visual diagram, and derives correcting variables from the deviations, which e.g. are available as analog voltage values at the outputs, and are supplied to the controllable components of the system, as previously described.

The following describes in detail how the adjustable components of the system are controlled.

To control amplifier 20 at the transmission end, the correcting variable $V_\nu$ must be transmitted from the receiving end to the transmitting end.

This transmission can be performed in a bidirectional transmission system, for example, by converting the correcting variable $V_\nu$ into an optical signal with an electrical-optical converter, and sending it to the transmission end by means of the wavelength-multiplex process. There, a conversion from an optical signal to an electrical signal takes place, which in turn represents the correcting variable $V_V$.

In this way the amplifier, and thereby also the electrical-optical converter, can be controlled as follows:

The correcting variable $V_\nu$ causes a change $\Delta I$ in the output current of the amplifier, which is proportional to the correcting variable $V_\nu$, i.e. $\Delta I \sim V_\nu$. A change in the current $\Delta I$ of the electrical-optical converter 2 causes a change in frequency $\Delta \nu$ of the optical digital signal, which is proportional to the change in current $\Delta I$; i.e. $\Delta \nu \sim \Delta I$. The change in frequency $\Delta \nu$ is equivalent to a change in wavelength $\Delta \lambda$. This makes the rise in frequency of the optical-electrical converter 2 controllable. Another correcting variable $V_D$ controls the bias voltage of the photodiode in the optical-electrical converter 5, and thereby controls the capacitance of the photodiode, as described earlier. In this way the frequency process of the optical-electrical converter is controllable, which is an advantage when an integrator with a different time constant is to be used. This was already mentioned in connection with the integrator.

The threshold value of the decision-circuit 6 can be controlled by the correcting variable $V_S$.

The device 30 for deriving the cycle produces a constant frequency cycle. The control of the decision-circuit by the correcting variable $V_T$ is such, that the phase of the cycle is controlled, i.e. the point in time of the decision is determined so that the opening of the visual diagram is at its widest.

The pulse generator 45 and the phase shifter 50 of device 60 for making visual diagrams are also controllable. The correcting variable $V_P$ controls the pulse generator and correcting variable $V_{100}$ controls the phase shifter. This controls the scan-lock circuit and thereby the point in time of the scanning.

The measures described herein permit the visual diagram, which results from the received digital signal, to be influenced and to optimize the transmission quality of the system.

Independently of the system described so far, the making of visual diagrams, the comparison with a specified visual diagram and the control of system components can take place with each optical communications transmission system for the transmission of digital signals.

The transmission over a dispersion-affected optical fiber described herein produces an intensity-modulated signal in the optical receiver. From there, a decision-circuit with an intermediate storage recovers the data signal.

As mentioned earlier, this signal can be adulterated by interference impulses.

The following describes the creation of an error and a measure to reduce the error frequency.

Figure 9A:
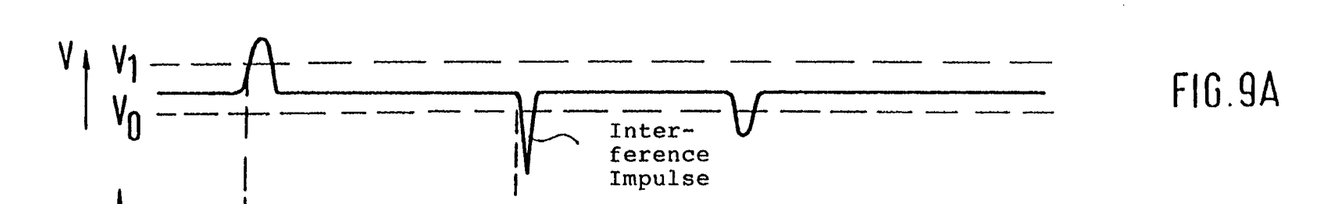
FIGS. 9(A)–9(B) represent the received voltage, which corresponds to the optical signal, with an interference impulse.
Figure 9B:
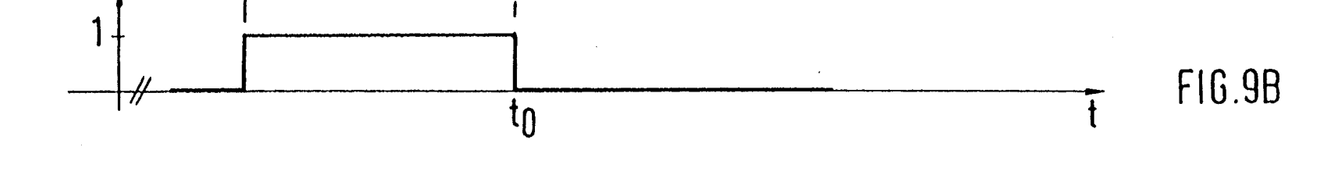

FIG. 9 a), for example, depicts the adulteration of an electrical signal in the receiver by means of a negative interference impulse. It considers the instance where a negative interference impulse occurs during the above explained process in the electrical output signal at the receiving end of an optical-electrical converter at a point in time $t_0$. In this instance, the magnitude of the interference impulse is so great, that the threshold value $V_0$ of the decision-circuit falls short and the digital signal recovered by the decider changes from condition "1" to condition "0". In this case, the transition of the condition at the time point $t_0$ represents an error in the recovered data signal, which propagates.

To reduce the frequency of such errors, the intensity of the optical signal to be transmitted, which is a frequency-modulated signal, is varied in the optical transmitter as a function of the digital signal, when necessary.

This measure leads to the electrical signal, which is produced at the output of the optical-electrical converter 5 (FIG. 1), to undergo other voltage changes, in addition to the impulses coming from the digital signal. Details of this measure will be explained later.

Figure 10A:
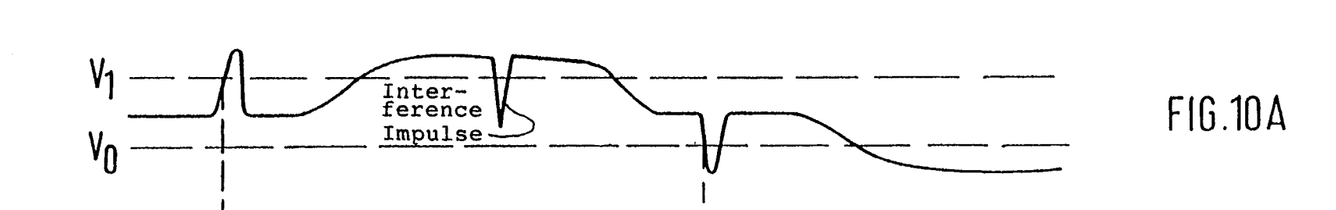
FIGS. 10(A)–10(B) represent the received voltage with positive and negative voltage change and an interference impulse.
Figure 10B:
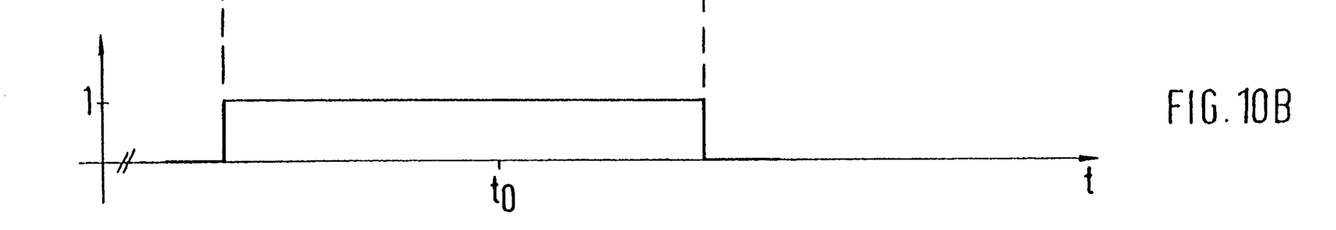

FIG. 10 a) shows the electrical signal (voltage process) with a positive and negative voltage change.

If a negative interference impulse occurs during the positive voltage change at time point $t_0$, whose magnitude in this example is equal to the interference impulse shown in FIG. 9 a), the positive voltage change prevents the shortfall of the lower threshold value $V_0$. Therefore no error takes place in the received digital signal.

The same applies if a positive interference impulse takes place during a negative voltage change. Errors can still take place, because the magnitude of interference impulses is subject to strong fluctuations in both the positive and negative direction. This is the case when the magnitude is high enough to fall short of the lower threshold value, for example. In that instance, an error only occurs during the length of the interference impulse. After that, the output signal is reset to the correct value. No error propagation takes place.

Figure 11:
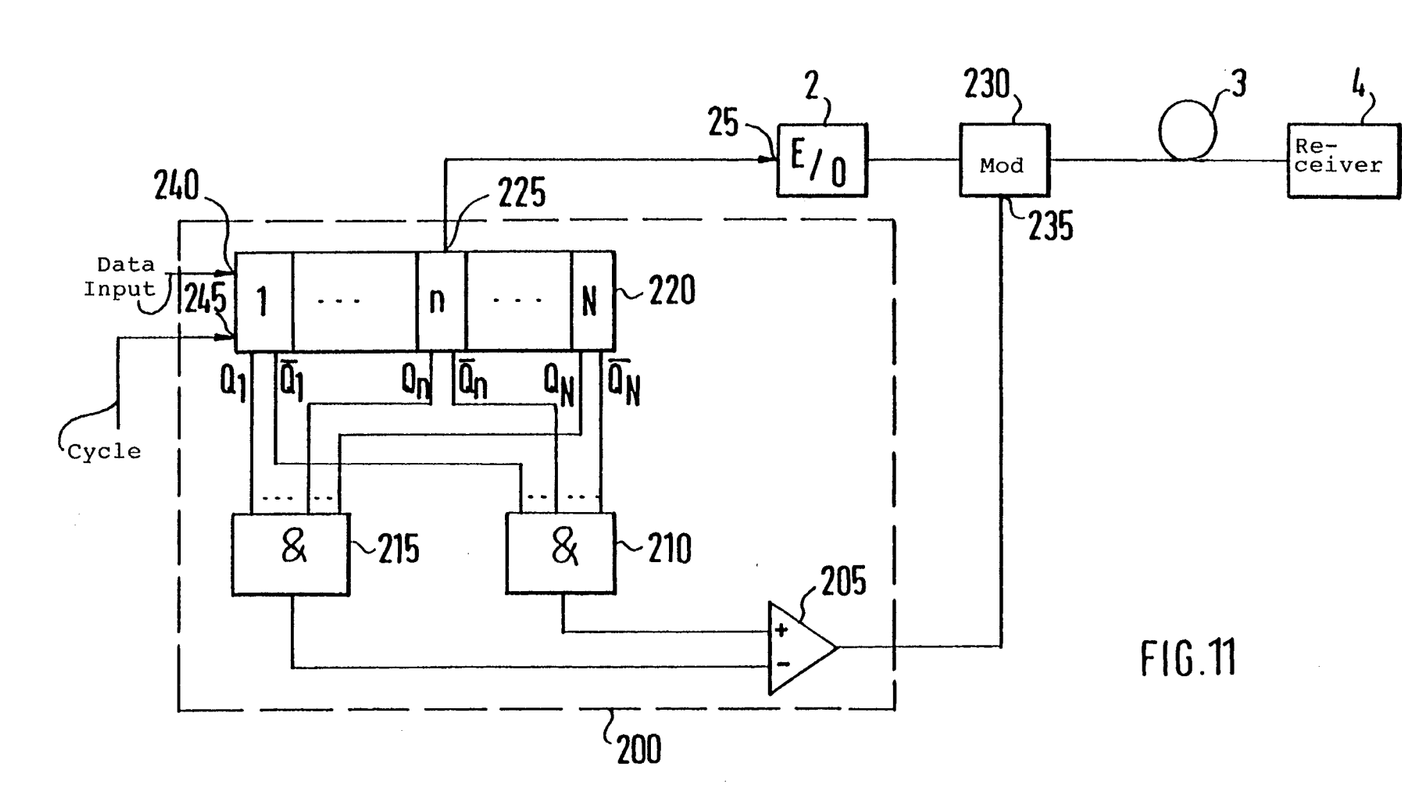
FIG. 11 is a configuration example of a circuit for improving the protection against interference.

The following explains, by means of FIG. 11, when and how positive or negative voltage changes occur, and a circuit arrangement that produces the voltage changes is indicated.

FIG. 11 shows the transmission end of the system in FIG. 1, complemented by a circuit arrangement 200 and an optical intensity modulator 230, which serve to impress intensity fluctuations on the optical signal.

An optical intensity modulator is a component, whose optical transmission depends on the existing voltage. An example would be a Mach-Zehnder interferometer. Further examples are described in the publication by Robert G. Waller "High-Speed III–V Semiconductor Intensity Modulators" IEEE Journal of Quantum Electronics, Vol. 27, No. 3, March 1991, pages 654–667.

The circuit arrangement 200 consists of an N-stage shift register 220, two AND-gates 210, 215 and one differential amplifier 205. The shift register 220 has an input 240 for the digital signal, and an input 245 for a cycle. Output 225 is connected to input 25 of the electrical-optical converter 2. $Q_i$ and $\overline{Q}_i$ ($i=1, 2, \ldots, N$) are outputs of the shift register, which are connected to the AND-gates 210, 215: e.g. $Q_i$ to AND-gate 215 and $\overline{Q}_i$ to AND-gate 210. The outputs of the AND-gates are connected to the inputs of the differential amplifier 205, whose output is connected to input 235 of optical amplitude modulator 230.

The digital signal to be transmitted is sequentially entered into the shift register. The AND-gates form a logic circuit, which tests whether all shift register N outputs $Q_i$ or $\overline{Q}_i$ have the same binary logic state. If all outputs are $Q_i=$"1" a positive voltage is provided by the output of differential amplifier 205 to the optical intensity modulator; a negative voltage is provided if all outputs are $\overline{Q}_i=$"1".

A positive voltage at the optical intensity modulator results in a higher transmission, a negative voltage results in a lower one. This change in the transmission, and thereby the light output of the optical signal, produce the changes in intensity. Only a predetermined number of equal binary signals following each other produces and transmits a positive or a negative intensity change.

An intensity change lasts only until the first output $Q_i$ differs from the remaining outputs. An intensity change can therefore last for several cycles.

Changes in the intensity of the optical signal are converted into voltage changes by the receiver. This reduces the danger of interference impulses during long sequences of equal binary signals, thereby reducing the adulteration of the received binary signal.

We claim:

1. A system, comprising:
   an electrical-to-optical converter at a transmitting end of the system, responsive to a digital signal, for providing a frequency-shift-keyed (FSK) modulated optical output signal;
   an optical fiber with dispersion at an operating wavelength of the system, responsive to the FSK modulated optical output signal, for providing a fiber-transmitted FSK modulated optical output signal;
   an optical-to-electrical converter at a receiving end of the system, responsive to intensity variations of the fiber-transmitted FSK modulated optical output signal, for providing an electrical signal that corresponds to the intensity variations in the fiber-transmitted FSK modulated optical output signal; and
   a decider, responsive to the intensity variations of the electrical signal froe the optical-to-electrical converter, for providing a recovered digital signal.

2. A system according to claim 1, wherein the decider changes the recovered digital signal from a first binary state into a second binary state when the electrical signal from the optical-to-electrical converter rises in pulse form, and changes from the second binary state into the first binary state when the electrical signal from the optical-to-electrical converter decreases in pulse form.

3. A system according to claim 1, wherein the decider changes the recovered digital signal from a first binary state into a second binary state when the electrical signal from the optical-to-electrical converter exceeds a predetermined threshold value, and changes back from the second binary state into the first binary state when the electrical signal falls below the predetermined threshold value.

4. A system according to claim 1, wherein the optical-to-electrical converter comprises an integrator that includes a photodetector, responsive to the optically transmitted digital signal, for providing a detected signal and a resistor in series with the photodetector and a voltage source, the resistor responsive to the detected signal for providing the electrical signal at a node between the photodetector and the resistor.

5. A system according to claim 4, wherein the integrator is an integrating low-pass filter.

6. A system according to claim 4, wherein a bias voltage connected to the photodetector, and thereby the capacitance of the photodetector can be adjusted to control the integrator.

7. A system according to claim 1, further comprising at the receiving end:
  a device, responsive to the electrical signal from the optical-to-electrical converter, for providing a visual diagram signal; and
  a computer, responsive to the visual diagram signal, for comparing the visual diagram signal with a predetermined visual diagram signal and for providing one or more correction variable signals wherein one or more of the optical-to-electrical converter and the decider are responsive to a corresponding one or more of the correction variable signals for being adjusted thereby.

8. A system according to claim 7, wherein means are provided for providing one of the correction variable signals, for controlling an amplifier that provides the digital signal to the electrical-to-optical converter, wherein the computer controls the amplifier by means of said one of the correction variable signals.

9. A system according to claim 7, wherein the optical-to-electrical converter comprises a photodiode, and wherein the computer provides one of the correction variable signals for controlling a bias voltage of the photodiode.

10. A system according to claim 7, wherein the decider is responsive to one of the correction variable signals for controlling a threshold value of the decider.

11. A system according to claim 7, wherein the decider is responsive to one of the correction variable signals for controlling a phase of a decider cycle.

12. A system according to claim 1, further comprising:
  a circuit arrangement at the transmission end, responsive to the digital signal, for temporarily storing and for then providing the digital signal to the electrical-to-optical converter and for providing a positive or negative output voltage signal when a predetermined number of successive equal binary signals of the digital signal are present; and
  an optical intensity modulator, responsive to the optical output signal and to the positive or negative output voltage signal, for increasing the light output of the optical output signal provided to the optical fiber according to a starting voltage of the output voltage signal when the successive equal binary signals reach a first binary state, and which lowers the light output of the optical output signal when the successive equal binary signals reach a second binary state.

13. An installation at a receiving end of a system for optical transmission of a digital signal over a dispersion-affected optical fiber, wherein the digital signal is optically transmitted over the optical fiber by modulating a semiconductor laser by frequency-shift-keying (FSK) according to values of the digital signal, wherein the installation at the receiving end comprises:
  an optical-to-electrical converter, responsive to intensity variations of the optically-transmitted digital signal, for providing an electrical signal having intensity variations; and
  a decider, responsive to the electrical signal, for recovering the digital signal from the intensity variations of the electrical signal, wherein the optically-transmitted digital signal to which the optical-to-electrical converter is responsive is the optical signal transmitted over the dispersion-affected optical fiber.

14. An installation according to claim 13, wherein the recovered digital signal from the decider changes from a first binary state into a second binary state when the electrical signal from the optical-to-electrical converter rises in pulse form, and changes from the second state into the first binary state when the electrical signal decreases in pulse form.

15. An installation according to claim 13, wherein the decider, in recovering the digital signals, changes the electrical signal from a first binary state into a second binary state when the electrical signal exceeds a predetermined threshold value, and changes back from the second binary state into the first binary state when the electrical signal falls below the predetermined threshold value.

16. An installation according to claim 13, wherein the optical-to-electrical converter comprises an integrator that includes a photodetector, responsive to the optically transmitted digital signal, for providing a detected signal and a resistor in series with the photodetector and a voltage source, the resistor responsive to the detected signal for providing the electrical signal at a node between the photodetector and the resistor.

17. A method for use of an optical fiber with dispersion at a predetermined wavelength, comprising the steps of:
  modulating by frequency-shift-keying (FSK) an optical input signal input to the fiber with a digital signal;
  transporting the FSK modulated optical input signal over the fiber for converting the optical input signal into an optical output signal; and
  directly demodulating intensity variations in the optical output signal from the optical fiber, for recovering the digital signal without having to frequency demodulate the optical output signal.

18. A system for optically transmitting a digital signal over an optical fiber by means of an optical sender at a transmitting end of the system, with an optical receiver at a receiving end of the system, the receiver comprising an optical-electrical converter with a photodiode responsive to the optically transmited digital signal for providing a detected signal and a decision circuit responsive to the detected signal for providing a recovered digital signal, wherein the system at the receiving end further comprises a device, responsive to the recovered digital signal for providing an actual visual diagram signal indicative of the recovered digital signal wherein the system at the receiving end further comprises a computer, responsive to the actual visual diagram signal, for comparing the actual visual diagram signal with a predetermined visual diagram signal, for determining and providing one or more correction variable signals wherein one or both of the optical sender and optical receiver are responsive to a corresponding one or more of the correction variable signals for being adjusted thereby.

19. A system according to claim 18, wherein the photodiode is responsive to one of the correction variable signals from the computer wherein the computer controls a bias voltage of the photodiode by means of the one of the correction variable signals.

20. A system according to claim 18, wherein one of the correction variable signals is provided to the transmitting end of the system, for controlling an amplifier that provides the digital signal to the optical sender, wherein the computer controls the amplifier.

21. A system according to claim 18, wherein the decision circuit is responsive to one of the correction variable signals for controlling a threshold value of the decision circuit.

22. A system according to claim 18, wherein the decision circuit is responsive to one of the correction variable signals for controlling a phase of a decision circuit cycle.

* * * * *

UNITED STATES PATENT AND TRADEMARK OFFICE
CERTIFICATE OF CORRECTION

PATENT NO. : 5,371,625
DATED : December 6, 1994
INVENTOR(S) : Wedding et al

It is certified that error appears in the above-indentified patent and that said Letters Patent is hereby corrected as shown below:

At column 12, line 63 (claim 1, line 18), please change "froe" to --from--.

At column 13, line 24 (claim 6, line 3), please insert "," after "photodetector".

Signed and Sealed this

Eleventh Day of April, 1995

Attest:

BRUCE LEHMAN

*Attesting Officer*     *Commissioner of Patents and Trademarks*